US008810875B2

(12) United States Patent
Yabuuchi (10) Patent No.: US 8,810,875 B2
(45) Date of Patent: Aug. 19, 2014

(54) IMAGE READING APPARATUS AND METHOD, AND IMAGE FORMING APPARATUS

(71) Applicant: KYOCERA Document Solutions Inc., Osaka (JP)

(72) Inventor: Yasuyuki Yabuuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/728,708

(22) Filed: Dec. 27, 2012

(65) Prior Publication Data

US 2013/0170003 A1 Jul. 4, 2013

(30) Foreign Application Priority Data

Dec. 28, 2011 (JP) ................................. 2011-288001

(51) Int. Cl.
| | | |
|---|---|---|
| *H04N 1/04* | (2006.01) | |
| *H04N 1/407* | (2006.01) | |
| *H04N 1/00* | (2006.01) | |
| *G03G 15/00* | (2006.01) | |
| *H04N 1/12* | (2006.01) | |
| *H04N 1/409* | (2006.01) | |

(52) U.S. Cl.
CPC ............... *H04N 1/121* (2013.01); *H04N 1/407* (2013.01); *H04N 1/00084* (2013.01); *H04N 1/00588* (2013.01); *H04N 1/00037* (2013.01); *H04N 2201/0094* (2013.01); *G03G 15/602* (2013.01); *H04N 1/4095* (2013.01); *H04N 2201/0081* (2013.01); *H04N 1/00013* (2013.01)

USPC ............ 358/498; 358/497; 358/474; 358/496

(58) Field of Classification Search
USPC .......................... 358/498, 497, 474, 496, 485
See application file for complete search history.

(56) References Cited

U.S. PATENT DOCUMENTS

| 8,284,465 | B2 | 10/2012 | Ishikawa | |
|---|---|---|---|---|
| 2009/0161124 | A1* | 6/2009 | Tamura | ......................... 358/1.1 |
| 2010/0020362 | A1* | 1/2010 | Suzuki | ......................... 358/448 |
| 2010/0020370 | A1 | 1/2010 | Ishikawa | |
| 2012/0293824 | A1* | 11/2012 | Ogasawara | ................. 358/1.14 |

FOREIGN PATENT DOCUMENTS

JP 2010-28546 2/2010

* cited by examiner

*Primary Examiner* — Houshang Safaipour
(74) *Attorney, Agent, or Firm* — Gerald E Hespos; Michael J Porco; Matthew T Hespos (57) ABSTRACT

An image reading apparatus includes a tray to place a document, a conveying mechanism for a document, a reader for a document image, a detector for detecting a sheet jam, an image processor and a controller. The image processor performs an image processing for removing document smear from an image read by the reader. The controller controls a document conveying operation by the conveying mechanism and a document reading operation by the reader. If a jammed document is removed and the document is placed again on the document tray after the detector detects a sheet jam, the controller performs a sheet jam recovery processing for causing the conveying mechanism to convey the document again and causing the reader to read the image of the document. The image processor performs the image processing on the image of the jammed document read by the reader during the sheet jam recovery processing.

10 Claims, 6 Drawing Sheets

FIG.1

LEFT ←→ RIGHT

IMAGE READING APPARATUS AND METHOD, AND IMAGE FORMING APPARATUS

This application is based on Japanese Patent Application Serial No. 2011-288001 filed with the Japan Patent Office on Dec. 28, 2011, the contents of which are hereby incorporated by reference.

BACKGROUND

The present disclosure relates to an image reading apparatus and an image forming apparatus for reading an image of a document by automatically feeding the document.

An image reading apparatus and an image forming apparatus are known in which an ADF (Automatic Document Feeder) for automatically feeding documents is installed and documents successively fed by the ADF are read by an image sensor. The ADF picks up documents placed on a document tray one by one and feed them to a conveyance path provided inside thereof. The image sensor provided to face the conveyance path optically reads an image of a document passing along the conveyance path. Further, the ADF discharges the document having the image read to a discharge tray.

However, a document may be caught by a conveyor roller or the like arranged in the conveyance path to cause a sheet jam (jam) during the conveyance of a document by the ADF. There is an apparatus which treats a document to be read immediately after the resumption of document conveyance after the conveyance by the ADF is stopped due to the occurrence of a jam as a damaged document (document bent or creased due to the jam) having caused the jam, reads the damaged document by a flat-bed method while reading other documents by an ADF method. According to this apparatus, a reading operation after a jam can be efficiently performed.

In removing a document having caused a jam, the smear of the conveyor roller adheres to document surfaces in some cases. In the case of the above apparatus, the efficiency of the reading operation after the jam is improved, but the smear adhering to the document is read as it is. This necessitates operations such as an operation of remaking the smeared document.

An object of the present disclosure is to provide image reading apparatus and method and an image forming apparatus capable of smoothly performing a reading operation after a jam even if a document is smeared due to a jam.

SUMMARY

An image reading apparatus according to one aspect of the present disclosure includes a tray on which a document is to be placed, a conveying mechanism, a reader, a detector, an image processor and a controller. The conveying mechanism conveys a document placed on the document tray to a predetermined document reading position. The reader reads an image of a document at the document reading position. The detector detects a sheet jam having occurred during the conveyance of a document by the conveying mechanism. The image processor performs an image processing for removing document smear from an image read by the reader. The controller controls a document conveying operation by the conveying mechanism and a document reading operation by the reader.

If the detector detects a sheet jam, the controller stops the document conveying operation by the conveying mechanism and the document reading operation by the reader. On the other hand, when the detection of the sheet jam by the detector is cancelled because of the removal of the jammed document having caused the sheet jam and the document is placed on the document tray again after the detector detects the sheet jam, the controller performs a sheet jam recovery processing for causing the conveying mechanism to convey the document and causing the reader to read an image of the document. The image processor performs the image processing on an image of the jammed document read by the reader during the sheet jam recovery processing.

These and other objects, features and advantages of the present disclosure will become more apparent upon reading the following detailed description along with the accompanying drawings.

DETAILED DESCRIPTION

Figure 1:
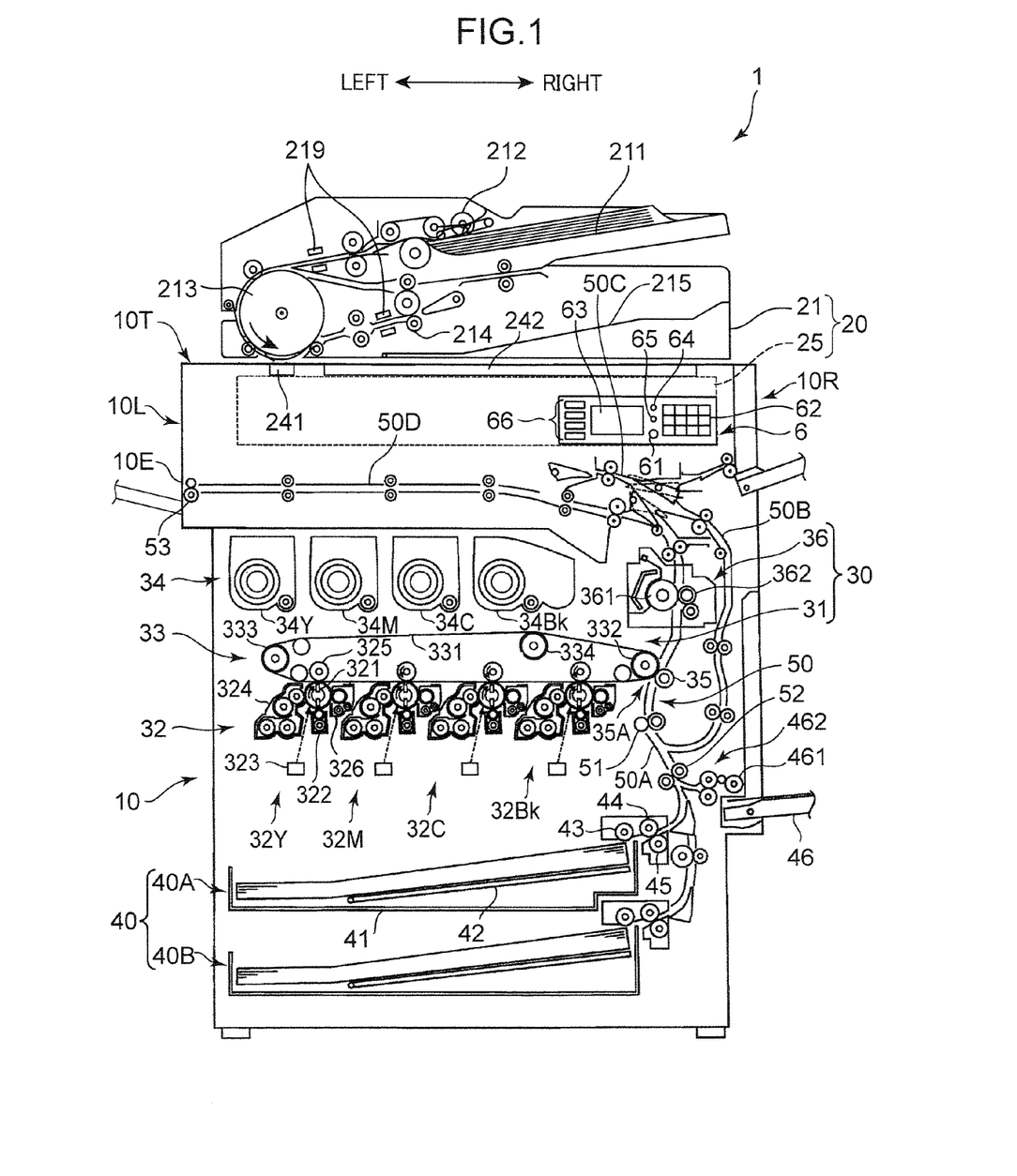
FIG. 1 is a sectional view showing the internal structure of an image forming apparatus.

Hereinafter, an embodiment of the present disclosure is described based on the drawings. FIG. 1 is a sectional view showing the internal structure of an image forming apparatus 1 according to one embodiment of the present disclosure. Here, a complex machine is described as an example of the image forming apparatus 1. However, the present disclosure can also be applied to a single-function apparatus such as a scanner, a copier or a facsimile machine if an ADF is provided.

The image forming apparatus 1 includes an apparatus main body 10 and a document conveying unit 21 (conveying mechanism) arranged on an upper surface 10T of the apparatus main body 10. An image reading apparatus 20 includes the document conveying unit 21 and a scanner 25 (reader). The document conveying unit 21 is an ADF (Automatic Document Feeder) and is openably and closably mounted on the upper surface 10T of the apparatus main body 10. The document conveying unit 21 automatically feeds a document to a predetermined document reading position (position where a first contact glass 241 is mounted) in the apparatus main body 10. On the other hand, when a user manually places a document at a predetermined document reading position (arrangement position of a second contact glass 242), the document conveying unit 21 is opened upward.

The document conveying unit 21 includes a document tray 211, a feed roller 212, a conveyor drum 213, a discharge roller 214 and a discharge tray 215. The document tray 211 is a place where documents are to be placed. The uppermost one of documents placed on the document tray 211 is picked up one by one by the feed roller 212 and fed toward the conveyor drum 213. The document fed by way of the conveyor drum 213 is discharged to the discharge tray 215 by the discharge roller 214.

Jam sensors 219 (detector) are disposed in the document conveyance path. In this embodiment, an example is illustrated in which the respective jam sensors 219 are provided at upstream and downstream sides of the document reading position. The jam sensors 219 detect a document jam (sheet jam) during conveyance. When detecting a jam, the jam sensors 219 send a signal to a controller 71 to be described later.

The scanner 25 for optically reading a document image, an image forming station 30 for performing an image forming process to form an image read by the scanner 25 on a sheet, a sheet feeding unit 40 for storing sheets to be conveyed to the image forming station 30 and a conveyance path 50 for conveying a sheet from the sheet feeding unit 40 to a sheet discharge opening 10E by way of the image forming station 30 are housed in the apparatus main body 10.

The scanner 25 optically reads an image of a document through the first contact glass 241 used to read a document automatically fed from the document conveying unit 21 on the upper surface 10T of the apparatus main body 10 or through the second contact glass 242 used to read a manually placed document.

Here, a flat-bed reading mode for reading a document placed on the second contact glass 242 by the scanner 25 and an ADF reading mode are set as document reading methods of the image reading apparatus 20. In the ADF reading mode, the scanner 25 optically reads document images when documents placed on the document tray 211 are picked up one by one by the feed roller 212 and pass on the first contact glass 241 provided in the conveyance path from the conveyor drum 213 to the discharge tray 215.

An input operation unit 6 is provided on the front surface of the image reading apparatus 20. The input operation unit 6 includes a start key 61, a numerical keypad 62 used to input the number of print copies and the like, a display unit 63, a reset key 64 used to reset contents set on the display unit 63 and the like, a stop key 65, function changeover keys 66 used to switch a copy function, a printer function, a scanner function and a facsimile function from one to another, and the like.

The image forming station 30 includes an image generating unit 31 for generating a toner image and transferring this onto a sheet, and a fixing unit 36 for fixing the toner image to the sheet. The image generating unit 31 includes four image forming units 32Y, 32M, 32C and 32Bk for forming toner images of yellow (Y), magenta (M), cyan (C) and black (Bk), an intermediate transfer unit 33 arranged above and adjacent to the image forming units 32, and a toner supply unit 34 arranged above the intermediate transfer unit 33.

Each of the image forming units 32Y, 32M, 32C and 32Bk includes a photoconductive drum 321, and a charger 322, an exposure device 323, a developing device 324, a primary transfer roller 325 and a cleaning device 326 arranged around this photoconductive drum 321.

The photoconductive drum 321 rotates about its shaft and an electrostatic latent image and a toner image are formed on the circumferential surface thereof. The charging device 322 is for uniformly charging the surface of the photoconductive drum 321. The exposure device 323 includes optical devices such as a laser light source, a mirror and a lens and irradiates the circumferential surface of the photoconductive drum 31 with light modulated based on image data of a document image, thereby forming an electrostatic latent image.

The developing device 324 supplies a toner to the circumferential surface of the photoconductive drum 321 to develop an electrostatic latent image formed on the photoconductive drum 321. The primary transfer roller 325 forms a nip portion together with the photoconductive drum 321 by sandwiching an intermediate transfer belt 331 provided in the intermediate transfer unit 33 and primarily transfers a toner image on the photoconductive drum 321 onto the intermediate transfer belt 331. The cleaning device 326 includes a cleaning roller and the like and cleans the circumferential surface of the photoconductive drum 321 after the transfer of a toner image.

The intermediate transfer unit 33 includes the intermediate transfer belt 331, a drive roller 332, a driven roller 333 and a tension roller 334. The intermediate transfer belt 331 is an endless belt mounted on these rollers 332, 333 and 334 and toner images from a plurality of photoconductive drums 321 are transferred in a superimposed manner on the outer circumferential surface of the intermediate transfer belt 331 (primary transfer). The drive roller 332 is a roller for applying a drive force to rotate the intermediate transfer belt 331, and a secondary transfer roller 35 is arranged to face the circumferential surface of the drive roller 332. A nip portion between the drive roller 332 and the secondary transfer roller 35 serves as a secondary transfer portion 35A for transferring a full-color toner image superimposed on the intermediate transfer belt 331 to a sheet. Note that the driven roller 333 is a roller which is driven as the intermediate transfer belt 331 rotates and the tension roller 334 is a roller for applying a predetermined tension to the intermediate transfer belt 331.

The toner supply unit 34 includes a yellow toner container 34Y, a magenta toner container 34M, a cyan toner container 34C and a black toner container 34Bk. These toner containers 34Y, 34C, 34M and 34Bk are for storing the toners of the respective colors and supply the toners of the respective colors to the developing devices 324 of the image forming units 32Y, 32M, 32C and 32Bk corresponding to the respective colors YMCBk via unillustrated supply paths.

The fixing unit 36 includes a fixing roller 361 having a fixing belt heated by an induction heating method provided on the outer periphery, and a pressure roller 362 which forms a fixing nip portion by being pressed into contact with the fixing roller 361. A sheet having a toner image secondarily transferred thereto in the secondary transfer portion 35A passes through the fixing nip portion to be heated and pressed, whereby the toner image is fixed to a sheet surface.

The sheet feeding unit 40 includes sheet cassettes 40A, 40B in two levels for storing sheets to which an image forming process is to be applied. These sheet cassettes 40A, 40B can be withdrawn forward from the front side of the apparatus main body 10. The sheet cassettes 40A, 40B are cassettes provided for automatic sheet feeding. A sheet feed tray 46 for manual sheet feeding is also provided on a right side surface 10R of the apparatus main body 10. The sheet feed tray 46 is openably and closably attached to the apparatus main body 10 at a lower end part thereof. The user opens the sheet feed tray 46 as shown and places a sheet thereon in the case of manual sheet feeding.

The sheet cassette 40A (40B) includes a sheet storing portion 41 for storing a sheet stack made up of a plurality of sheets stacked one over another and a lift plate 42 for lifting up the sheet stack for sheet feeding. A pickup roller 43 and a pair of a feed roller 44 and a retard roller 45 are arranged above the right end side of the sheet cassette 40A (40B). The uppermost sheet of the sheet stack in the sheet cassette 40A (40B) is picked up one by one and carried to an upstream end of the conveyance path 50 by driving the pickup roller 43 and the feed roller 44. On the other hand, sheets placed on the sheet feed tray 46 are carried into the conveyance path 50 by similarly driving a pickup roller 461 and a feed roller 462.

The conveyance path 50 includes a main conveyance path 50A for conveying a sheet from the sheet feeding unit 40 to the exit of the fixing unit 36 via the image generating unit 31, a reversing conveyance path 50B for returning a sheet having one side printed to the image generating unit 31 in the case of printing both sides of the sheet, a switchback conveyance path 50C for conveying a sheet from a downstream end of the main conveyance path 50A to an upstream end of the reversing conveyance path 50B, and a horizontal conveyance path 50D for horizontally conveying a sheet from the downstream end of the main conveyance path 50A to the sheet discharge opening 10E provided in a left side surface 10L of the apparatus main body 10.

A pair of registration rollers 51 is arranged at a side of the main conveyance path 50A upstream of the secondary transfer portion 35A. A sheet is temporarily stopped at the pair of registration rollers 51 and fed to the secondary transfer portion 35A at a predetermined timing for image transfer after a skew correction. Besides these, a plurality of conveyor rollers 52 for conveying a sheet are arranged in the main conveyance path 50A. The same holds for the other conveyance paths 50B, 50C and 50D.

A discharge roller 53 at the most downstream end of the conveyance path 50 either discharges a sheet to a discharge tray provided below the sheet discharge opening 10E or feeds the sheet to an unillustrated post-processing apparatus arranged on the left side surface 10L of the apparatus main body 10 through the sheet discharge opening 10E.

Figure 2:
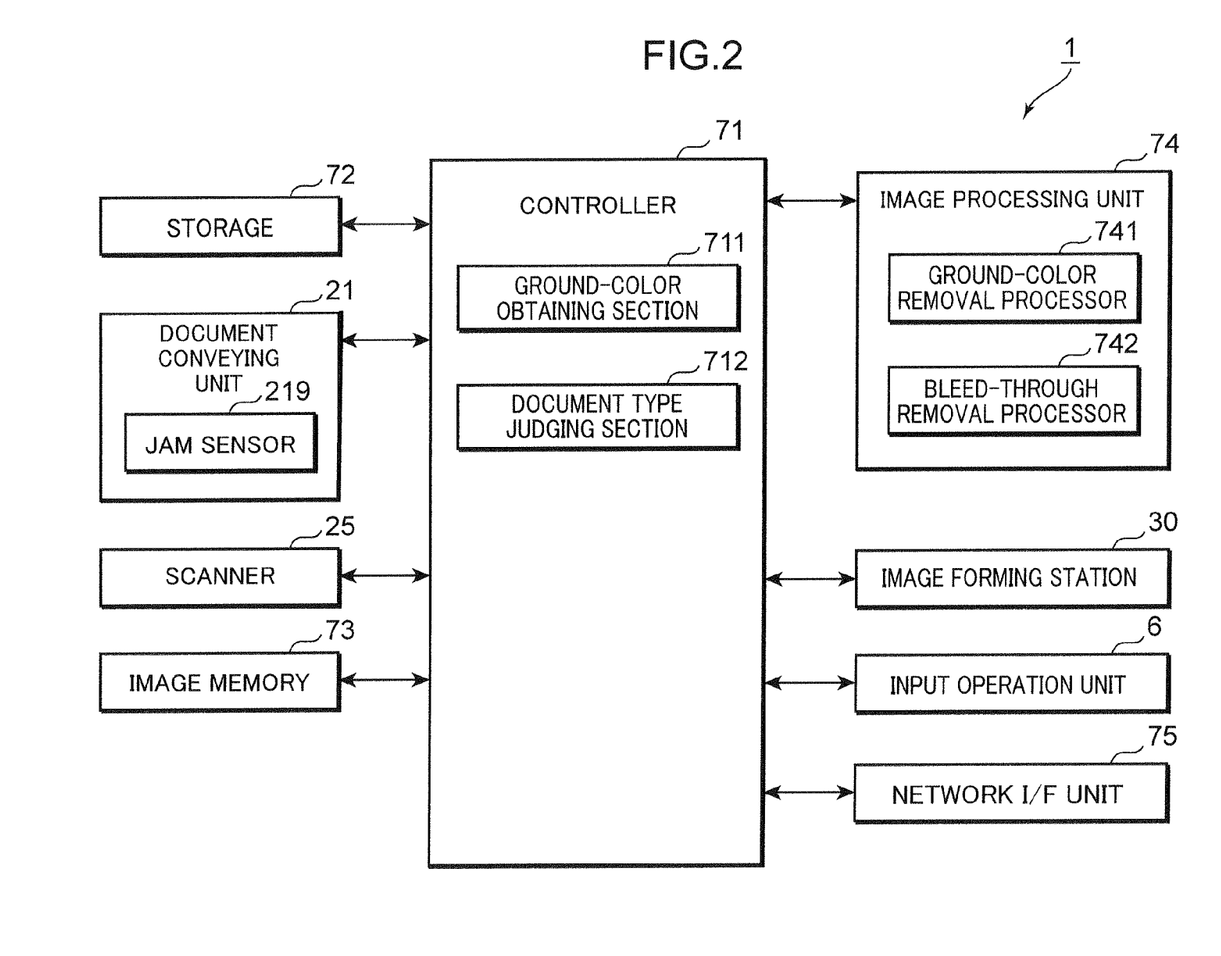
FIG. 2 is a block diagram showing the electrical configuration of the image forming apparatus.

FIG. 2 is a block diagram showing the electrical configuration of the image forming apparatus 1. The image forming apparatus 1 includes the controller 71, a storage 72, the document conveying unit 21, the scanner 25, an image memory 73, an image processing unit 74, the image forming station 30, the input operation unit 6 and a network I/F unit 75. Note that the same components as those described with reference to FIG. 1 are denoted by the same reference signs and not described.

The storage 72 is for storing a program for realizing various functions of the image forming apparatus 1, data and the like. The image memory 73 temporarily stores an image read by the scanner 25 and data received by the network I/F unit 75.

The image processing unit 74 applies various image processings such as correction, size enlargement and reduction to an image read by the scanner 25. Further, the image processing unit 74 of this embodiment includes a ground-color removal processor 741 (image processor) and a bleed-through removal processor 742 (image processor) to perform an image processing for removing document smear from the image.

The ground-color removal processor 741 performs a ground-color removal processing for removing the ground color of a document included in an image read from the document from the image and converting the ground color to white or solid color. Specifically, the ground-color removal processor 741 regards an area having a density not higher than a given density level as a ground-color part and changes the color of the ground-color part to white by forcibly converting the density level of such a ground-color part to 0.

The bleed-through removal processor 742 performs a processing for removing bleed-through by removing gradation components lower than an upper limit gradation of a preset bled-through image. The bleed-through is a phenomenon in which an image on the other side of a document appears in an image read from an image on one side of the document. An image read from a document may include unnecessary images such as a ground color not desired to be reproduced and the bleed-through. Particularly, in the case of reading a thin document, a bled-through image which is an image on the other side of the document is often included in a read image. Such a bled-through image is generally composed of low gradation components. The bleed-through removal processor 742 performs the processing for removing the bleed-through by removing such low gradation components.

Note that the ground-color removal processing by the ground-color removal processor 741 and the bleed-through removal processing by the bleed-through removal processor 742 described above are merely examples and processing methods other than the above may be adopted.

The network I/F unit 75 is an interface circuit for carrying out a communication with external apparatuses via a network such as a LAN (Local Area Network) or a WAN (Wide Area Network).

The controller 71 is constructed by a CPU (Central Processing Unit), reads and executes the program stored in the storage 72, and centrally controls the image forming apparatus 1, such as by outputting command signals to the respective functional units and transferring data. Further, the controller 71 controls a document conveying operation by the document conveying unit 21 and a document reading operation by the scanner 25. The controller 71 includes a ground-color obtaining section 711 and a document type judging section 712. The ground-color obtaining section 711 obtains the ground color of a document from an image read from the document. The document type judging section 712 judges whether or not a read document is a character document or a document including a picture or a map.

Figure 3:
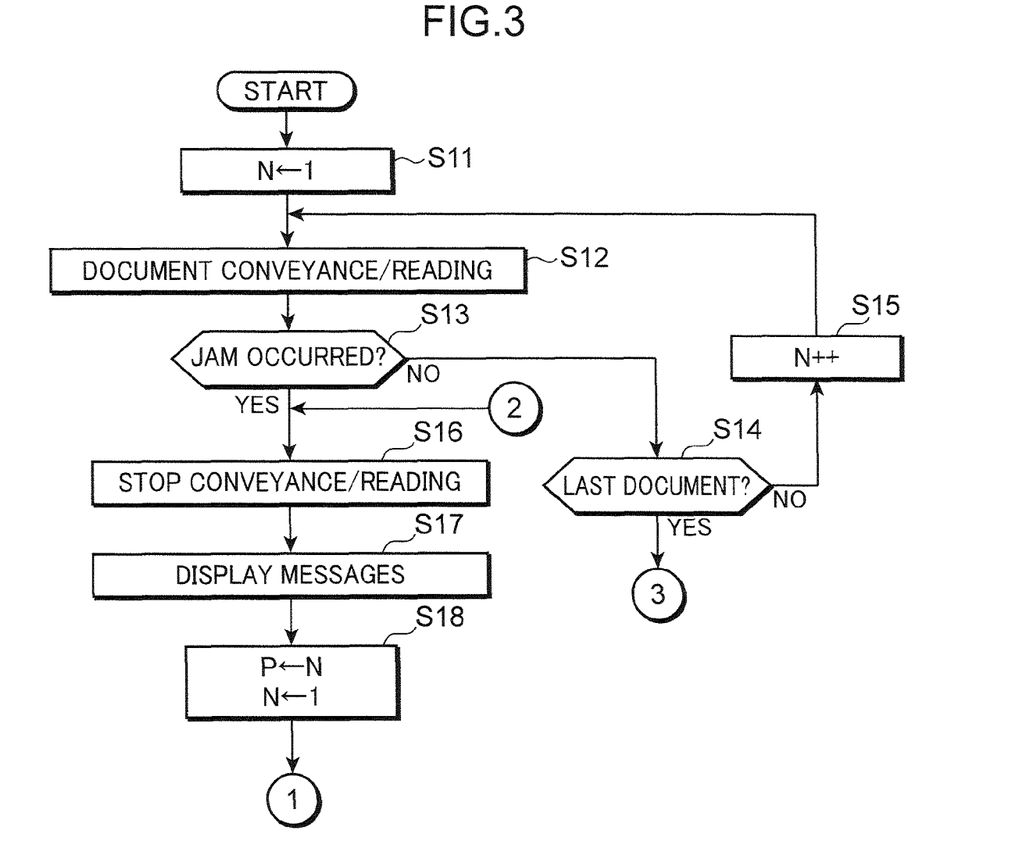
FIG. 3 is a flow chart showing the flow of an image reading process.
Figure 4:
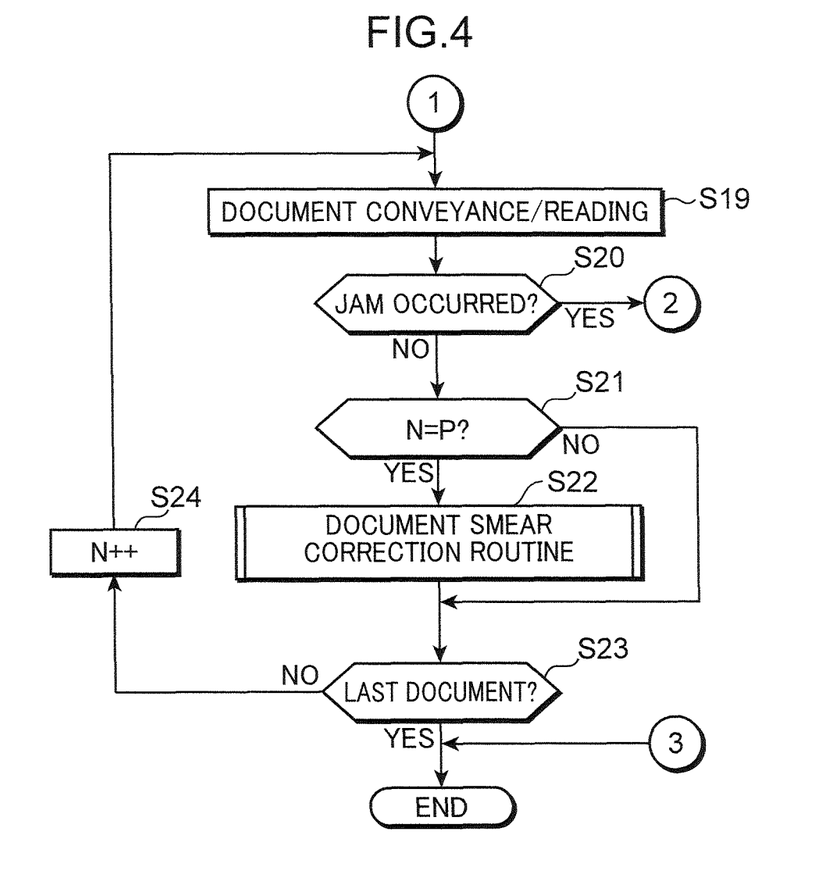
FIG. 4 is a flow chart following the flow chart of FIG. 3 showing the flow of the image reading process.

FIGS. 3 and 4 are a flow chart showing the flow of an image reading process in this embodiment. First, the controller 71 assigns 1 to a variable N (Step S11). This variable N indicates the number of documents conveyed toward the conveyor drum 213.

The document conveying unit 21 picks up the uppermost document out of those placed on the document tray 211 and conveys it toward the conveyor drum 213. The scanner 25 reads an image of the document when the document passes on the first contact glass 241 (Step S12). The scanner 25 accumulates and stores data of the read image in the image memory 73.

The controller 71 finishes the process if the jam sensors 219 do not detect any jam (Step S13; NO) until the document picked up from the document tray 211 is discharged to the document discharge tray 215 and the document read in Step S12 is the last document (Step S14; YES).

If the document read in Step S12 is not the last document (Step S14; NO), the controller 71 increments the variable N (Step S15) and proceeds to Step S12.

If any of the jam sensors 219 detects a jam (Step S13; YES), the controller 71 causes the document conveying unit 21 and the scanner 25 to stop document conveyance and reading (Step S16). Further, the controller 71 causes the display unit 63 to display a message notifying the jam to the user and a message instructing to place the document in the document conveying unit 21 on the document tray 211 again after removing it (step S17). Note that the value of the variable N at this point of time indicates the page number of the document having caused the jam (hereinafter, referred to as the "jammed document").

Here, the user only has to place all the documents including the jammed document, which were originally to be read, in an original order in placing the documents on the document tray 211 after the occurrence of the jam.

Thereafter, the controller 71 assigns the content of the variable N to a variable P and assigns 1 to the variable N (Step S18). The document conveying unit 21 picks up the uppermost document out of those placed on the document tray 211 and conveys it toward the conveyor drum 213 and the scanner 25 reads an image of the document when the document passes on the first contact glass 241 (Step S19). Note that the documents properly read in Step S12 (for which reading had been finished when the jam occurred) may be only conveyed toward the document discharge tray 215 without being read in Step S19. That is, the scanner 25 may not read the documents while the variable N<the variable P.

If any of the jam sensors 219 detects a jam again (Step S20; YES) until the document picked up from the document tray 211 is discharged to the document discharge tray 215, the controller 71 proceeds to Step S16.

If none of the jam sensors 219 detects a jam (Step S20; NO) and the values of the variables N and P are equal (Step S21; YES), the controller 71 proceeds to a document smear correction routine (Step S22). That the variables N and P are the same value indicates that the document read in Step S19 is the jammed document having caused the jam last time.

When the user removes a jammed document from the document conveying unit 21, the smear of various rollers of the document conveying unit 21 may adhere to document surfaces. Since the scanner 25 also reads the smear adhering to the document as an image, it causes a reduction in the quality of the read image or a print of the read image. Thus, in the document smear correction routine (Step S22), an image processing is applied to remove the document smear from the image read from the jammed document.

If the document smear correction routine is finished or the values of the variables N and P differ (Step S21; NO), the controller 71 discriminates whether or not the document read in Step S19 is the last document (Step S23). If it is not the last document (Step S23; NO), the controller 71 increments the variable N (Step S24) and proceeds to Step S19.

Figure 5:
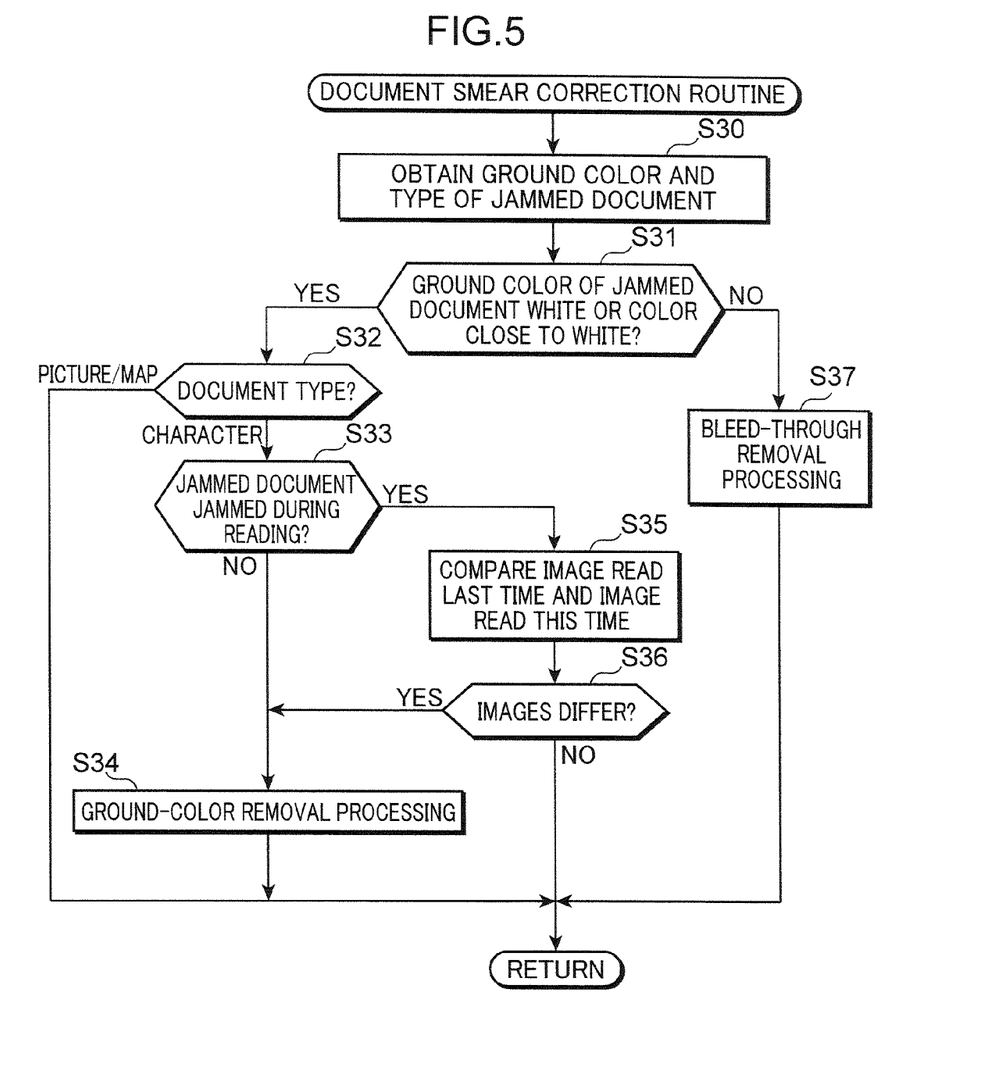
FIG. 5 is a flow chart showing the detail of processings of a document smear correction routine in FIG. 4.

FIG. 5 is a flow chart showing the flow of the document smear correction routine. First, the ground-color obtaining section 711 obtains the ground color of the jammed document from the image read from the jammed document by the scanner 25 and the document type judging section 712 discriminates the type of the jammed document (Step S30). For example, the ground-color obtaining section 711 generates a color histogram from the image read from the jammed document and selects a color with the highest frequency as the ground color of the jammed document.

If the ground color of the jammed document is white or a color lighter than a predetermined density (Step S31; YES) and the jammed document is a picture or map document (Step S32; picture/map), the ground-color removal processor 741 does not apply the image processing to the image read from the jammed document and the controller 71 finishes the document smear correction routine. If the ground-color removal processing and the bleed-through removal processing are performed on the picture or map document, unnecessary images corresponding to the document smear may be removed, but there is a high possibility of damaging the original image of the picture or map. Thus, in this embodiment, the processing for removing the document smear is not performed on the picture or map document.

If the ground color of the jammed document is white or a color lighter than the predetermined density (Step S31; YES), the jammed document is a character document (Step S32; character) and further the jammed document was not read at all in Step S12 (at the time of the occurrence of the jam) (Step S33; NO), the ground-color removal processor 741 applies the ground-color removal processing to the image read from the jammed document (Step S34). Thereafter, the controller 71 finishes the document smear correction process and proceeds to Step S23. By the ground-color removal processor 741 applying the ground-color removal processing to the image read from the jammed document, unnecessary images corresponding to the document smear can be removed and only the original image of the jammed document can be read.

On the other hand, if the jammed document was partly or entirely read in Step S12 (at the time of the occurrence of the jam) (Step S33; YES), i.e. the jam occurred while the scanner 25 was reading the document, the image processing unit 74 reads the image of the jammed document read in Step S12 and that read in Step S19 (after the occurrence of the jam) from the image memory 73 and compares the two images (Step S35). If the images before and after the occurrence of the jam differ (Step S36; Yes), there is a high possibility that different parts correspond to the document smear. Thus, the ground-color removal processor 741 applies the ground-color removal processing to the image read from the jammed document after the occurrence of the jam (Step S34). Thereafter, the controller 71 finishes the document smear correction process and proceeds to Step S23.

If the images before and after the occurrence of the jam are the same (Step S36; NO), the controller 71 finishes the document smear correction process and proceeds to Step S23. If the images before and after the occurrence of the jam are the same, there is a low possibility that the document smear is adhering to the jammed document. Thus, a processing load of the image processing unit 74 can be reduced by not performing the ground-color removal processing by the ground-color removal processor 741 in this case.

Here, if the jammed document was partly (e.g. upper half of the document) read in Step S12 (before the occurrence of the jam), the image processing unit 74 compares this upper half image with the image of the upper half of the jammed document read in Step S19 (after the occurrence of the jam). That is, the image processing unit 74 compares the images in the same range of the jammed document.

If the ground color of the jammed document is neither white nor a color lighter than the predetermined density (Step S31; NO), i.e. the jammed document is a color sheet, the bleed-through removal processor 742 applies the bleed-through removal processing to the image read from the jammed document (Step S37). Thereafter, the controller 71 finishes the document smear correction process and proceeds to Step S23. By the bleed-through removal processor 742 applying the bleed-through removal processing to the image read from the jammed document, unnecessary images corresponding to the document smear can be removed and only the original image of the jammed document can be read.

As described above, if a jam occurs during the reading of a document and the document is read again thereafter, the ground-color removal processor 741 applies the ground-color removal processing and the bleed-through removal processor 742 applies the bleed-through removal processing to the image read from the jammed document, whereby unnecessary images corresponding to the document smear can be removed. Thus, even if the smear adheres to the jammed document, a reduction in the quality of the image read from that document can be prevented.

Further, the user needs neither to set any input for the jammed document nor to remove the smear from the jammed document during the re-reading after the occurrence of the jam. That is, since it is sufficient to place the documents on the document tray 211 as usual, the reading operation at the time of the occurrence of the jam can be made simpler and more efficient.

Further, image reading apparatuses of recent years are equipped with a ground-color removal function and a bleed-through removal function in many cases. That is, it is not necessary to develop a new program for removing the smear adhering to the jammed document and the document smear can be removed using existing ground-color removal program and bleed-through removal program, wherefore cost and time required for program development can be reduced.

<Modification>

In the above embodiment, the bleed-through removal processor 742 applies the bleed-through removal processing to the image read from the jammed document if the ground color of the jammed document is neither white nor a color lighter than the predetermined density, i.e. if the jammed document is a color document. Besides this, there is also a method for removing document smear by applying the ground-color removal processing even if a jammed document is a color document.

Figure 6:
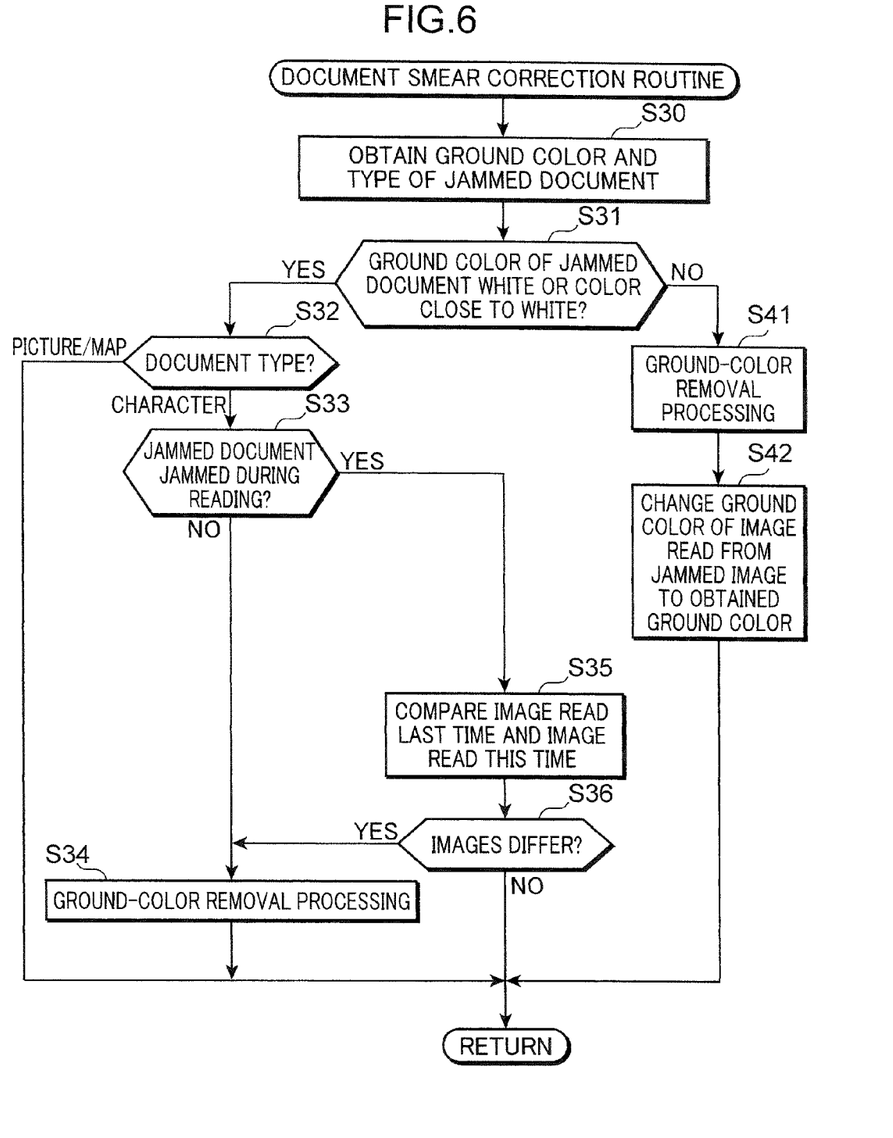
FIG. 6 is a flow chart showing a modification of the document smear correction routine.

FIG. 6 is a flow chart showing a modification of the process of the document smear correction routine. The same steps as the processing steps of FIG. 5 are denoted by the same step numbers and not described.

If the ground color of the jammed document is neither white nor a color lighter than the predetermined density (Step S31; NO), i.e. the jammed document is a color sheet, the ground-color removal processor 741 applies the ground-color removal processing to the image read from the jammed document (Step S41). Then, the image processing unit 74 changes the ground color of the image having the ground color removed to the ground color obtained by the ground-color obtaining section 711 (Step S42). Then, the controller 71 finishes the document smear correction process and proceeds to Step S23.

According to this modification, the image processing unit 74 applies the ground-color removal processing to the image read from the jammed document and, thereafter, the ground-color obtaining section 711 changes the ground color to the obtained ground color of the jammed document. Thus, unnecessary images corresponding to the document smear can be removed and only the original image of the jammed document can be read.

As described above, according to the present disclosure, it is possible to provide an image reading apparatus and an image forming apparatus capable of smoothly performing a reading operation after a jam even if a document is smeared due to the jam.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image reading apparatus, comprising:
   a tray on which a document is to be placed;
   a conveying mechanism for conveying a document placed on the document tray to a predetermined document reading position;
   a reader for reading an image of a document at the document reading position;
   a detector for detecting a sheet jam having occurred during the conveyance of a document by the conveying mechanism;
   an image processor for performing an image processing for removing document smear from an image read by the reader;
   a controller for controlling a document conveying operation by the conveying mechanism and a document reading operation by the reader;
   wherein:
   the controller stops the document conveying operation by the conveying mechanism and the document reading operation by the reader when the detector detects a sheet jam and performs a sheet jam recovery processing for causing the conveying mechanism to convey the document and causing the reader to read an image of the document if the detection of the sheet jam by the detector is cancelled because of the removal of the jammed document having caused the sheet jam and the document is placed on the document tray again after the detector detects the sheet jam; and
   the image processor performs the image processing on the image of the jammed document read by the reader during the sheet jam recovery processing, and wherein:
   if the reader has read a partial or entire image of the jammed document before the detector detects the sheet jam, the image processor:
   compares the partial or entire image of the jammed document read by the reader before the sheet jam and the image of the jammed document read by the reader during the sheet jam recovery processing after the sheet jam recovery processing by the controller; and
   performs the image processing if the both images differ and does not perform the image processing on the image of the jammed document if the both images are the same.

2. An image reading apparatus according to claim 1, wherein the image processor compares the partial image of the jammed document and an image which is a part of the image of the jammed document read by the reader during the sheet jam recovery processing and in the same range as the partial image if the reader has read a part of the jammed document before the sheet jam.

3. An image reading apparatus, comprising:
   a tray on which a document is to be placed;
   a conveying mechanism for conveying a document placed on the document tray to a predetermined document reading position;
   a reader for reading an image of a document at the document reading position;
   a detector for detecting a sheet jam having occurred during the conveyance of a document by the conveying mechanism;
   an image processor for performing an image processing for removing document smear from an image read by the reader;
   a controller for controlling a document conveying operation by the conveying mechanism and a document reading operation by the reader;
   a ground-color obtaining section for obtaining the ground color of the jammed document, wherein:
   the controller stops the document conveying operation by the conveying mechanism and the document reading operation by the reader when the detector detects a sheet jam and performs a sheet jam recovery processing for causing the conveying mechanism to convey the document and causing the reader to read an image of the document if the detection of the sheet jam by the detector is cancelled because of the removal of the jammed document having caused the sheet jam and the document is placed on the document tray again after the detector detects the sheet jam; and
   the image processor performs:
   the image processing on the image of the jammed document read by the reader during the sheet jam recovery processing;
   a ground-color removal processing for removing the ground color of the jammed document as the image processing after the sheet jam recovery processing by the controller if the color obtained by the ground-color obtaining section is white or a color with a density not higher than a predetermined density; and a processing for changing the ground color to the ground color of the jammed document obtained by the ground-color obtaining section after performing the ground-color removal processing for removing the ground color of the jammed document as the image processing after the sheet jam recovery processing by the controller if the ground color of the jammed document obtained by the ground-color obtaining section is neither white nor a color with a density not higher than the predetermined density.

4. An image reading apparatus, comprising:

a tray on which a document is to be placed;

a conveying mechanism for conveying a document placed on the document tray to a predetermined document reading position;

a reader for reading an image of a document at the document reading position;

a detector for detecting a sheet jam having occurred during the conveyance of a document by the conveying mechanism;

an image processor for performing an image processing for removing document smear from an image read by the reader;

a controller for controlling a document conveying operation by the conveying mechanism and a document reading operation by the reader;

a ground-color obtaining section for obtaining the ground color of the jammed document, wherein:

the controller stops the document conveying operation by the conveying mechanism and the document reading operation by the reader when the detector detects a sheet jam and performs a sheet jam recovery processing for causing the conveying mechanism to convey the document and causing the reader to read an image of the document if the detection of the sheet jam by the detector is cancelled because of the removal of the jammed document having caused the sheet jam and the document is placed on the document tray again after the detector detects the sheet jam; and the image processor performs:

the image processing on the image of the jammed document read by the reader during the sheet jam recovery processing;

a ground-color removal processing for removing the ground color of the jammed document as the image processing after the sheet jam recovery processing by the controller if the color obtained by the ground-color obtaining section is white or a color with a density not higher than a predetermined density, and a bleed-through removal processing for removing a bleed-through part of an image on the other side of the document in the read image as the image processing after the sheet jam recovery processing by the controller if the ground color of the jammed document obtained by the ground-color obtaining section is neither white nor a color with a density not higher than the predetermined density.

5. An image reading apparatus according to claim 4, wherein the image processor performs the bleed-through removal processing if the jammed document is a color sheet.

6. An image reading apparatus, comprising:

a tray on which a document is to be placed;

a conveying mechanism for conveying a document placed on the document tray to a predetermined document reading position;

a reader for reading an image of a document at the document reading position;

a detector for detecting a sheet jam having occurred during the conveyance of a document by the conveying mechanism;

an image processor for performing an image processing for removing document smear from an image read by the reader;

a controller for controlling a document conveying operation by the conveying mechanism and a document reading operation by the reader; and a document type judging section for discriminating whether the jammed document is a character document or a picture or map document, wherein:

the controller stops the document conveying operation by the conveying mechanism and the document reading operation by the reader when the detector detects a sheet jam and performs a sheet jam recovery processing for causing the conveying mechanism to convey the document and causing the reader to read an image of the document if the detection of the sheet jam by the detector is cancelled because of the removal of the jammed document having caused the sheet jam and the document is placed on the document tray again after the detector detects the sheet jam;

the image processor performs the image processing on the image of the jammed document read by the reader during the sheet jam recovery processing; and the image processor does not perform the image processing on the image of the jammed document after the sheet jam recovery processing by the controller if the jammed document is the picture or map document.

7. An image forming apparatus, comprising:

an image reading apparatus for reading an image of a document according to claim 1; and an image forming station for forming an image read by the image reading apparatus on a sheet.

8. An image forming apparatus, comprising:

an image reading apparatus for reading an image of a document according to claim 3; and an image forming station for forming an image read by the image reading apparatus on a sheet.

9. An image forming apparatus, comprising:

an image reading apparatus for reading an image of a document according to claim 4; and an image forming station for forming an image read by the image reading apparatus on a sheet.

10. An image forming apparatus, comprising:

an image reading apparatus for reading an image of a document according to claim 6; and an image forming station for forming an image read by the image reading apparatus on a sheet.

* * * * *